United States Patent [19]

Woo et al.

[11] Patent Number: 5,119,345

[45] Date of Patent: Jun. 2, 1992

[54] GEOPHONE

[75] Inventors: Daniel M. Woo, Missouri City; James C. Woodall, Jr., Houston, both of Tex.

[73] Assignee: Shaw Industries Ltd., Ontario, Canada

[21] Appl. No.: 695,274

[22] Filed: May 3, 1991

[51] Int. Cl.⁵ .............................................. G01V 1/16
[52] U.S. Cl. ...................................... 367/185; 29/594
[58] Field of Search ............................ 367/182–187; 29/25.35, 594, 609.1

[56] References Cited

U.S. PATENT DOCUMENTS

| | | | |
|---|---|---|---|
| 3,738,445 | 6/1973 | Wilson et al. | 367/181 |
| 3,913,063 | 10/1975 | Sears | 367/182 |
| 3,953,829 | 4/1976 | Boyle | 367/182 |
| 4,144,520 | 3/1979 | McNeel | 367/181 |
| 4,152,692 | 5/1979 | McNeel | 367/181 |
| 4,159,464 | 6/1979 | Hall, Jr. | 367/182 |
| 4,285,054 | 8/1981 | Woo et al. | 367/183 |

Primary Examiner—Brian S. Steinberger
Attorney, Agent, or Firm—Vaden, Eickenroht, Thompson & Boulware

[57] ABSTRACT

A geophone is disclosed that has a cylindrical housing closed at one end by a bottom and at the other end by a top. A magnet assembly and a coil-mass are located in the housing. Springs support the coil-mass for axial movement relative to the magnet assembly along the longitudinal axis of the housing. A pair of coil terminals are mounted in the upper end of the coil-mass adjacent the top of the housing. A pair of eyelets extend through the top of the housing and outside geophone terminals are attached to and extend through the eyelets into the housing. A pair of pigtails connect the geophone terminals to the coil terminals.

4 Claims, 2 Drawing Sheets

GEOPHONE

This invention relates to geophones generally, and pigtail type geophones in particular. Specifically, the invention relates to an improved construction for electrically connecting pigtails to the coil terminals and to the outside terminals extending through the top of the geophone housing.

Heretofore, one end of each pigtail was soldered to a post mounted on the coil-mass and the other end to a terminal extending through the metal top of the geophone case or housing. The metal case top assembly is expensive and requires insulated terminals extending through and hermetically sealed to the case top.

It is an object of this invention to provide a construction for electrically connecting pigtails to the coil terminals and outside terminals of a geophone that allows the top of the geophone housing to be made of molded plastic thereby substantially reducing the weight and manufacturing cost of the geophone as well as simplifying the task of connecting the coil to the outside terminals.

These and other objects, advantages, and features of the invention will be obvious to those skilled in the art from a consideration of the specification including the attached drawings and appended claims.

In the Drawings

Figure 1:
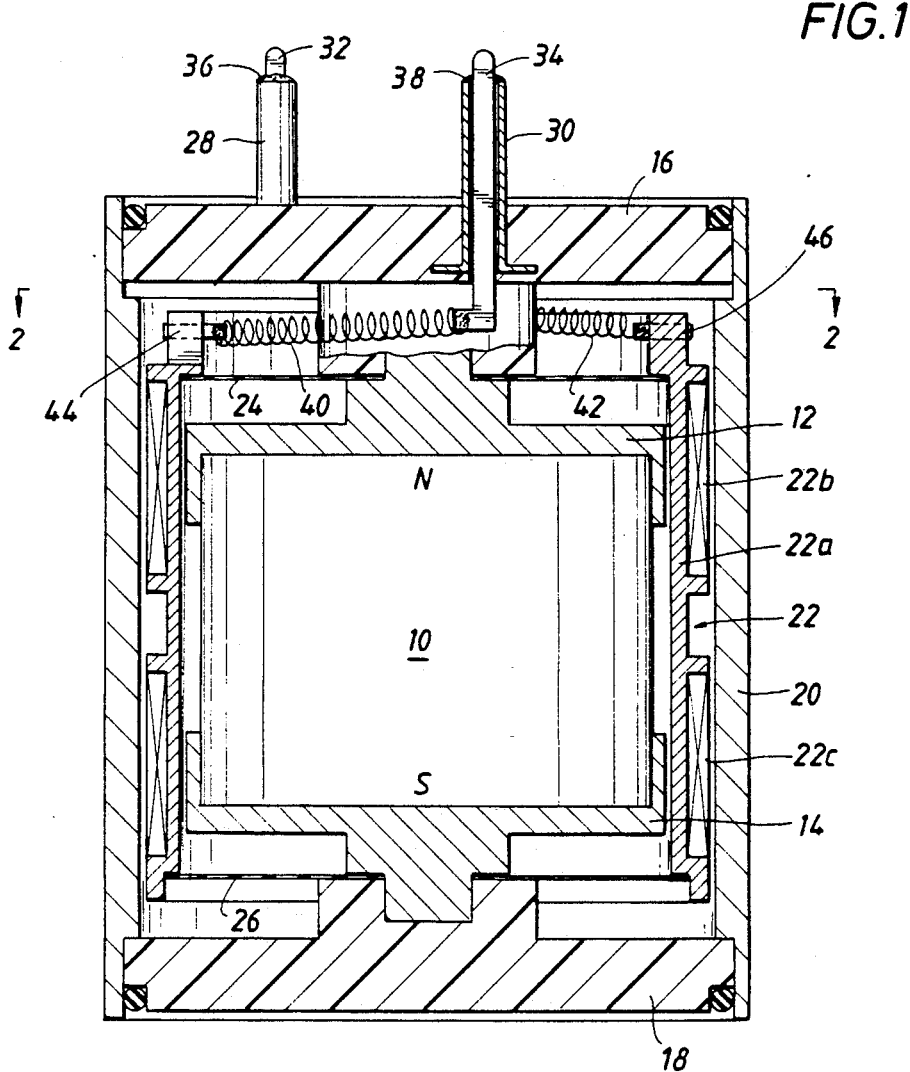
FIG. 1 is a vertical, sectional view, taken along line 1—1 of FIG. 2, through a geophone embodying the construction of this invention.

The geophone, as shown in the Figures, includes magnet 10 with pole pieces 12 and 14 positioned at each end. The magnet and its pole pieces are clamped between top 16 and bottom 18 of case 20. Coil mass 22 includes coil form 22a upon which wire coils 22b and 22c are wrapped. The coil mass is supported for movement relative to the longitudinal axis of the case by diaphragm springs 24 and 26.

In accordance with this invention, case top 16 is of molded plastic material to reduce the weight of the geophone and to reduce the cost of manufacturing the case top, as compared to the metal case top used in prior art geophones.

When top 16 is molded, eyelets 28 and 30 are embedded in the case top so that they extend outwardly from the case top as shown in FIG. 1. The eyelets are made of electrically conductive material, such as copper. Outside terminals 32 and 34, also of electrically conductive material, extend through the eyelets and are soldered to the eyelets to seal the annulus between the inside of the eyelets and the outside of the terminals and to electrically connect the terminals to the eyelets. These soldered joints are indicated by the numbers 36 and 38.

Figure 2:
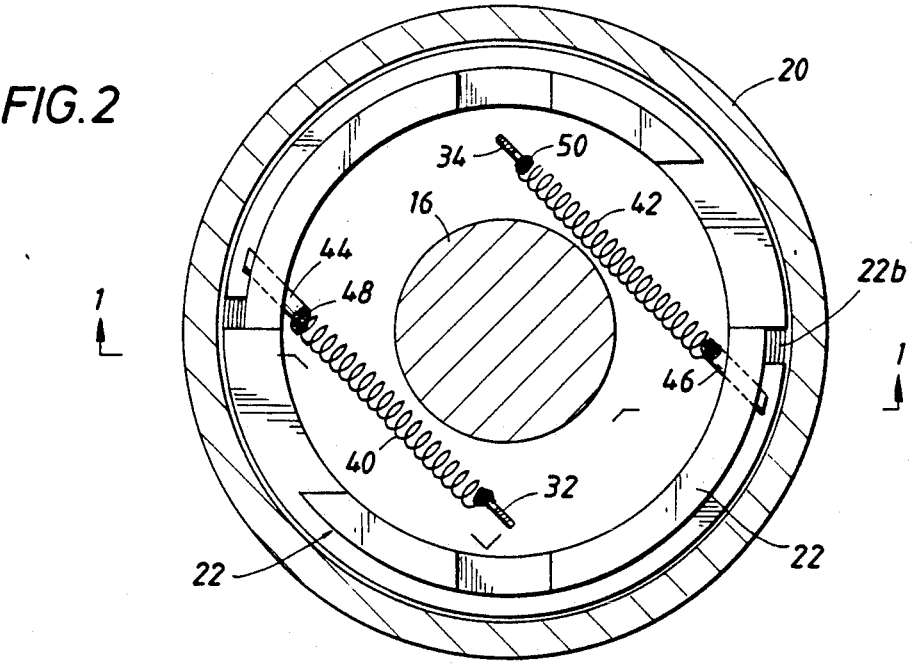
FIG. 2 is a sectional view taken along line 2—2 of FIG. 1.
Figure 3:
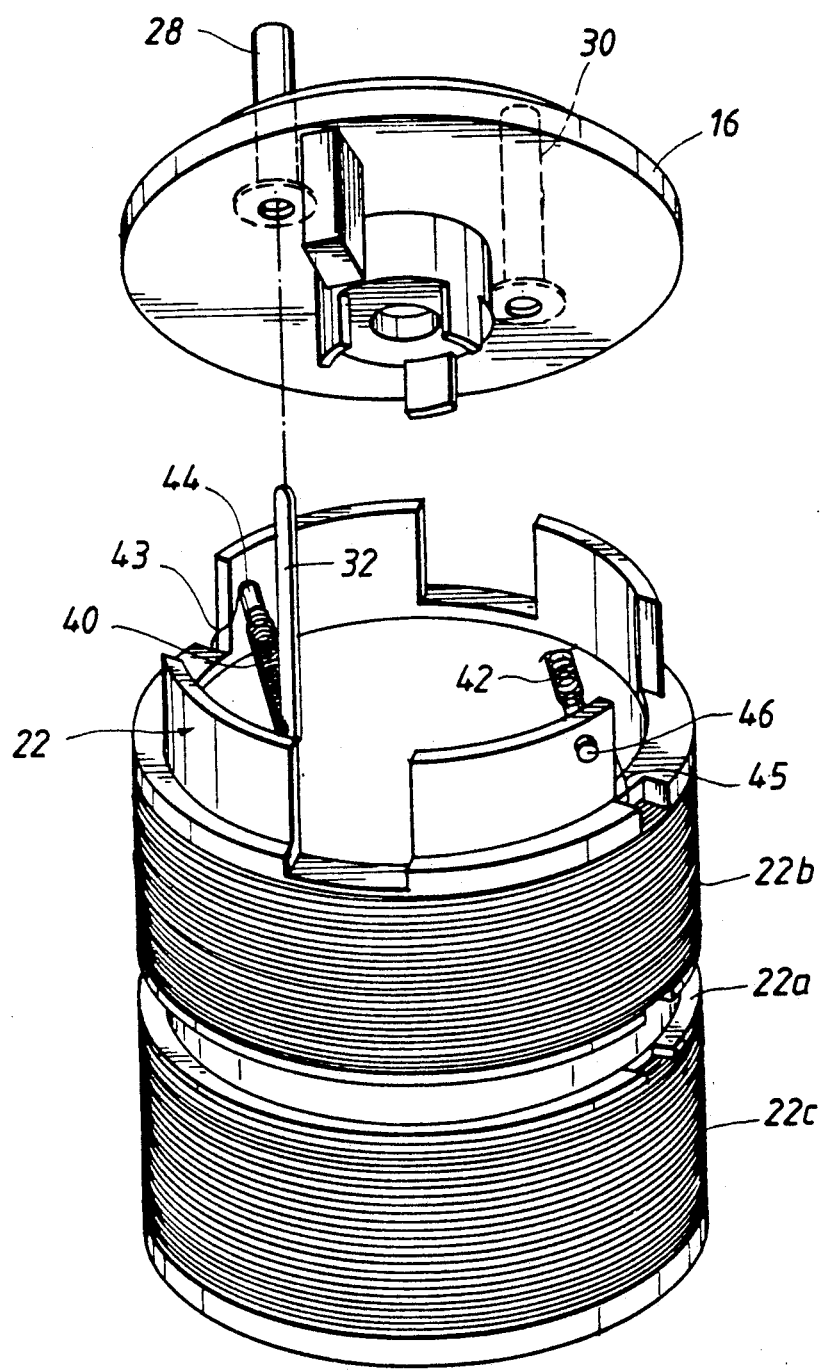
FIG. 3 is an exploded view of the case top of the geophone housing and the coil-form to illustrate the ease with which the outside terminals are assembled with the case top.

As shown in FIG. 2, pigtails 40 and 42 have one end connected to coil terminals 44 and 46 by solder, which is indicated by the members 48 and 50. The other ends of the pigtails are connected to terminals 32 and 34 also by soldered connections indicated by the numbers 52 and 54. The two ends of the wire forming coils 22b and 22c are indicated by the numbers 43 and 45 (FIG. 3). They are also connected to terminals 44 and 46 by soldered connections 48 and 50.

Thus, to assemble the geophone, pigtails 40 and 42 are soldered to coil mass terminals 44 and 46. The other ends of the pigtails are soldered to outside terminals 32 and 34. Case top 16 is then brought into position where terminals 32 and 34 can be inserted through eyelets 28 and 30 to the position shown and the terminals connected to the eyelets by soldering at the upper end of the eyelets well away from the plastic top so that the heat will have no detrimental effect on the plastic used to make the top. The case top can be positioned in the case prior to the soldering of the terminals and the eyelets because there will be sufficient friction between the eyelets and the terminals to hold the terminals in position as the case top is assembled with the case body. Thus, no soldering of the pigtails to the terminals is required with the terminals positioned in the case top as had previously been the case and which had made the assembly operation difficult and time consuming.

Preferably coil mass terminals 44 and 46 are short lengths of magnet wire covered with a solderable coating to allow the magnet wire from the signal coil to be soldered to the coil mass terminals by applying heat to the portion of the magnet wire in physical contact with the coil mass terminals, the pigtails, and the wire from the signal coil.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A method of assembling a geophone having a cylindrical housing, a permanent magnet, and a coil mass supported to move along the longitudinal axis of the housing and the magnet due to seismic energy, a top for closing the upper end of the housing with one side of the top inside the housing and one side outside the housing, hollow eyelets mounted in and extending through the top, and two outside terminals connected to the coil mass by two pigtails, comprising the steps of electrically connecting one end of each pigtail to the coil mass terminals and the other end of each pigtail to the outside terminals, positioning the top adjacent the upper end of the housing, inserting the outside terminals through the hollow eyelets from the inside side of the top, soldering the terminals to the eyelets to electrically connect the terminals to the eyelets and to seal the openings through the eyelets, and placing the top in sealing engagement with the upper end of the housing to close the upper end of the housing.

2. The geophone of claim 1 in which the eyelets are made of electrically conductive material.

3. The geophone of claim 1 in which the eyelets are made of copper.

4. The geophone of claim 1 in which the terminals are connected to the eyelets and the longitudinal openings through the eyelets are sealed with solder.

* * * * *